United States Patent [19]
Naito

[11] Patent Number: 5,446,706
[45] Date of Patent: Aug. 29, 1995

[54] OPTICAL DISC, DATA STORAGE AND RECOVERY

[76] Inventor: Albert T. Naito, 2776 Cibola, Costa Mesa, Calif. 92626

[21] Appl. No.: 901,995

[22] Filed: Jun. 22, 1992

[51] Int. Cl.$^6$ .................. G11B 7/08; G11B 17/04
[52] U.S. Cl. .................. 369/13; 360/98.06; 369/36
[58] Field of Search .............. 369/36, 38, 39, 178, 369/195, 13; 360/98.04, 98.05, 98.06

[56] References Cited

U.S. PATENT DOCUMENTS

| | | | |
|---|---|---|---|
| 4,286,790 | 9/1981 | Siryj et al. | 369/36 |
| 4,502,133 | 2/1985 | Siryj et al. | 369/36 X |
| 4,787,074 | 11/1988 | Deck et al. | 369/36 |

*Primary Examiner*—Tony M. Argenbright
*Attorney, Agent, or Firm*—Edward E. Roberts

[57] ABSTRACT

Optical discs are contained in sleeves each of which has a magnetizable element at one edge of the sleeve where the element can be attracted to an electromagnet. The disc and sleeve combinations are arranged side by side in an open sided carrier such that the magnetizable elements are positioned at the carrier's open side. An optical writer or reader is mounted for movement to a position opposite a selected disc and sleeve combination. An electromagnet element carried by the writer or reader is energizable to attract and hold the magnetizable element of the selected sleeve. A device on the reader or writer is capable of moving the electromagnet to pull the magnetizable element, the sleeve and the disc from the carrier to an operating position on the writer or reader and to push them back into the carrier. In the preferred form, the apparatus in which the disc is read and written to is provided with a device for moving the write and read head assembly from a position on either side of the disc to the other side.

15 Claims, 2 Drawing Sheets

OPTICAL DISC, DATA STORAGE AND RECOVERY

This invention relates to improved methods and means for transporting and reading and writing to optical discs.

BACKGROUND

The development of apparatus for optical recording and recovering of information from rotatable discs has created opportunity for making improvements in a variety of applications one of which is the storage of large volumes of records which are only infrequently recalled for examination, if ever. Death certificates, legislative proceedings, fingerprints, repair records, any of a very wide variety of public and private records which need to be archived are examples. The laser or optical disc can store images of pictures and signatures and has the potential for obsoleting the practice of warehousing paper copies in the hope that a particular copy can be recovered at some future time if needed. Together the optical disc and computers can identify both a record and its storage position and create indexes to permit rapid recover/of that information. Optical disc and computer technology provides the means for accomplishing the storage and recovery tasks but it requires special apparatus and some skill to use and maintain it. When the volume of records is small, filing copies in a cardboard box, may be more practical. However, facsimile technology has added the ability to transfer text and pictures and signatures electronically. It is possible to provide a central optical storage and recovery facility to which many public and private organizations can communicate electronically. Large central record storage and recovery facilities could afford skilled librarians and coding experts capable of storing documents so that they are readily identified and recoverable years after the source organization and it's people are no longer available to provide identifying clues. Some of the records that ought to be kept but which are not kept because of the cost of storage and recovery, could be saved if the optical disc and computer system could be made to accomplish storage and recovery of individual records at minimal cost. The cost of performing the tasks depends primarily upon cost of acquisition and maintenance of equipment, physical space requirements and record input and recovery time. The ratio of it's physical size to volume of storage capability is very high so the optical disc has the potential for solving the space problem if the disc handling apparatus permits close spacing of discs. The amount and cost of computer and disc writing and reading capability depends in large measure on record entry and recovery time. It is to entry and recovery time and space reduction that this invention is addressed.

In a facility for storing records which :may seldom if ever be recovered, much more writing capacity than recover capacity is required. Writing would be accomplished in parallel which means that several write units would operate at the same time recording on separate discs. Separation of records by originating organization or by subject matter would dictate setting a disc aside after writing a record and then recovering that disc at a later time for the addition of another record. Because of those system characteristics a large, central, optical storage and recovery facility can be expected to accumulate very large numbers of discs each disc of which must be stored to be readily available for reading and writing. A major element of any such optical disc storage facility, whether large or medium or small, would be the structure in which the discs were stored including the storage spaces for individual discs and the means for moving the individual discs between those spaces and write and read positions. A major contribution is made to the practicality and operating economics of optical record storage if the disc storage facility and the disc handling system can be made simple, inexpensive and reliable and if disc access time is minimized.

SUMMARY OF THE INVENTION

It is an object of this invention to provide an improved optical disc storage and disc handling method and means.

Another object is to provide such a method and means in which magnetizable elements are utilized in moving discs between storage and write and read positions.

Optical discs are contained in sleeves each of which has a magnetizable element at an edge of the sleeve where the element can be attracted to an electromagnet. The disc and sleeve combinations are arranged side by side in an open sided carrier such that the magnetizable elements are positioned at the carrier's open side. An optical writer or reader is mounted for movement to a position opposite a selected disc and sleeve combination. An electromagnet carried by the write or read head unit is energized to attract and hold the magnetizable element of the selected sleeve. Means on the read or write head unit is capable of moving the electromagnet to pull the magnetizable element, the sleeve and the disc from the carrier to an operating position on the write or read unit and to push them back into the carrier.

In the preferred form, the apparatus in which the disc is read and written to is provided with means for moving the write and read head assembly from a position on either side of the disc to the other side.

THE DRAWINGS

DESCRIPTION OF THE PREFERRED EMBODIMENT OF THE INVENTION

Figure 2:
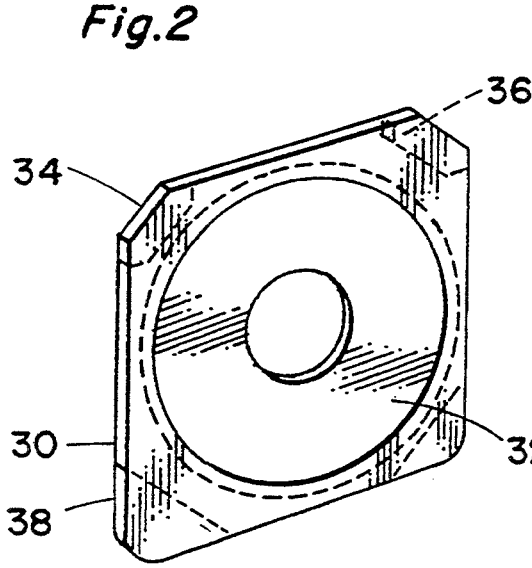
FIG. 2 is an isometric view of a preferred form of optical disc and sleeve in which the invention is embodied.

The invention is based in part on recognition that there is greater advantage in moving the optical disc read and write structures to the disc when the number of discs is large and they can be stacked side by side in minimum space. In the optical disc data storage and recovery system shown in the drawings each disc is contained in a substantially square protective container usually called a sleeve. Access openings at each side of the sleeve permit reading and writing without removal of the disc from the sleeve. The discs in their sleeves are stored side by side in a carrier which in one example holds 50 discs. A typical storage system module may comprise two read and write head units, five disc carriers each of which holds fifty discs, and means for moving the head units to positions opposite selected discs. A complete installation would include many such modules.

One advantage of that arrangement, in the event of a failure of a head, is that the disc carriers may be readily moved to a another, standby module while the defective unit is under repair. The simplicity of the disc carrier design, that is made possible when the heads move to the discs, makes it easy to move large numbers of discs and to minimize the time when they are not on line.

Figure 1:
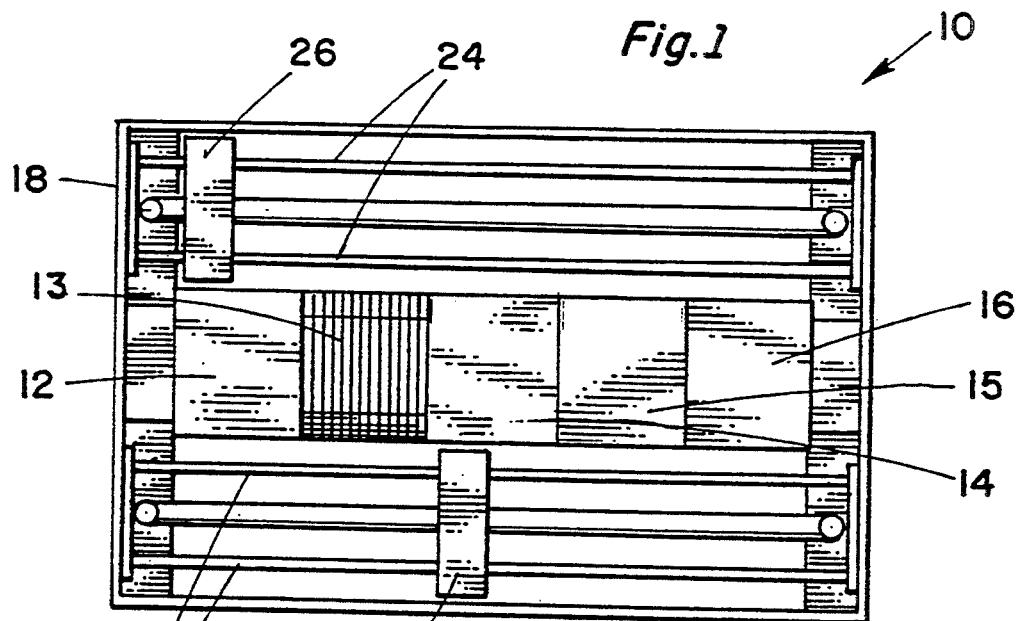
FIG. 1 is an isometric showing of a optical disc and sleeve combination embodying the invention, the cover of one of the disc carriers having been removed.

The mechanical portions of a preferred system module are depicted in FIG. 1 where they are generally designated 10. Discs are stored in five, removable disc carriers numbered 12, 13, 14, 15 and 16, respectively. They are arranged side by side in the central area of a frame 18. The cover of carrier 13 has been removed to expose the disc sleeves stored side by side within. The carriers are positioned between two sets of parallel rails on which the read and write head units move back and forth to positions opposite the sleeves of discs to or from which information is to be written or read. In the example shown, rail set 20 carries a read and write head unit 22 and rail set 24 carries a read and write head unit 26. Whether one or two rail sets are employed and whether the head units read or write or do both is a matter of choice made in the light of particular applications of the system.

The disc carriers in this case are formed with bottom and top walls and with side walls separated to accommodate 50 discs between them. In this example each disc and it's sleeve are held vertical by thin spacers, not shown, which extend down a short distance from the upper wall. The carriers have no end walls. Any disc and it's sleeve may be withdrawn from either end of the carrier into a head unit to be written on or read and then returned to the position in the carrier from which it was removed.

Discs can be removed and replaced by pushing or pulling them or by carrying them. Whichever mode or modes are used, there is a requirement for rapid jam free, highly repeatable transportation in and out of the disc's assigned position no withstanding any small dimensional differences in the disc sleeves and in the carriers or variations in the position of the discs from side to side in the carrier. The invention utilizes magnetizable elements to pull the discs from the carrier and pushing to return them. In the preferred embodiment, the magnetizable element is also used to carry the disc in some degree.

A magnetizable element is fixed in each disc sleeve at a point where it can be magnetized and attracted by an electromagnet carried on the head unit. A suitable mechanism moves the electromagnet toward the disc sleeve to engage the magnetizable element of the latter and to move the magnetizable element with the sleeve to the proper position on the head unit. It is also arranged to move the electromagnet structure to push the sleeve and disc back to their assigned position in the carrier. Ordinarily the disc is returned to original position but the fact that the head units are movable and can be made to stop at any selected disc position makes it possible to move discs from one position to another. In the preferred embodiment the magnetizable element is positioned in an upper corner of the sleeve. In the case in which the discs are removable at both sides of the carrier, a magnetizable element is fixed in each of the sleeve's upper corners. In the example selected for illustration in the drawings the upper corners of the disc sleeves are cut away at a forty five degree angle. One face of the magnetizable element is exposed at the cutaway corner so that it, and the sleeve and disc is attracted both outwardly and upwardly toward the electromagnet whose working face is formed at a matching forty five degree angle. The angle need not be forty five degrees but that angle is preferred.

Figure 3:
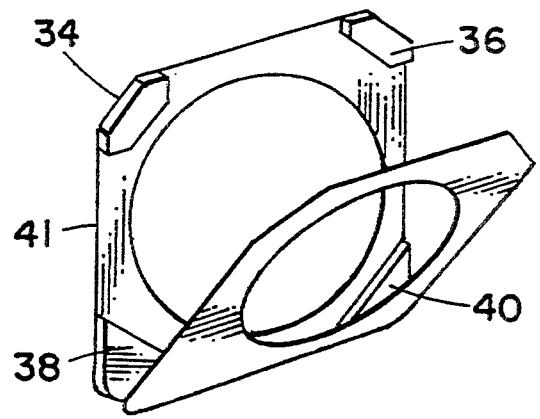
FIG. 3 is an isometric view of the optical disc sleeve of FIG. 2 at the stage in the assembly process when it is ready to receive the optical disc.

An assembled sleeve 30 and disc 32 combination is shown in FIG. 2. The sleeve 30, with a pair of magnetizable elements 34 and 36 and a pair of corner spacers 38 and 40 is shown at one stage of the assembly process in FIG. 3. As best shown in FIG. 3, the sleeve is formed from a sheet 41 of non magnetic material which is folded double. The magnetizable elements are secured by a suitable adhesive in the upper, cutoff corners of what will be one side of the sleeve. A pair of triangle shaped spacers are secured by a suitable adhesive to the other two corners of that one side of the sleeve. The magnetizable elements 34 and 36 and spacers are as thick, or slightly more thick than the optical disc that is placed against said one side of the sleeve between the magnetizable elements and spacers before the other side of the sleeve is laid on and secured by adhesives to the magnetizable elements and spacers to provide the assembled combination of FIG. 2. Dashed lines have been added to FIG. 2 to indicate the position of the disc, magnetizable elements and spacers within the sleeve. The central opening 42 of the disc is standard and is engaged by the drive mechanism which centers and rotates it during read and write operations.

Figure 4:
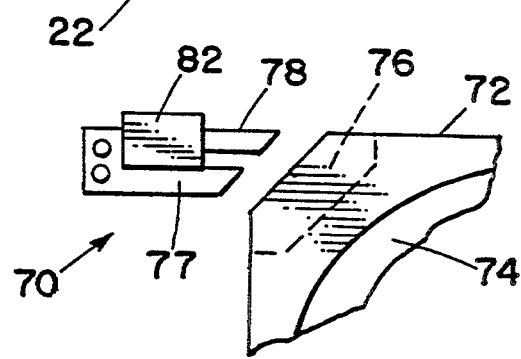
FIG. 4 shows a portion of a sleeve and disc combination in proximity to an electromagnet which, in assembled condition, is mounted on a read or write unit.

When it is required to read or write on one of the discs, the selected read or write unit is moved on its rails to a point opposite the disc. An electromagnet structure which is carried on the selected read or write unit is moved to a position proximate the near magnetizable element of the sleeve which contains the disc. When in position closely adjacent the magnetizable element, the electromagnet is energized to become a magnet. A typical construction of preferred form is depicted in FIG. 4. The electromagnet is numbered 70. The sleeve is numbered 72. It houses disc 74 and magnetizable element 76. In the condition shown the legs 77 and 78 of the "C-shaped" electromagnet 70 are positioned proximate to element 76. When coil 82 is energized a magnetic flux path is established around the C-shape, across the air gap from one leg to element 76, and from element 76 across the air gap to the other leg of the electromagnet.

Figure 5:
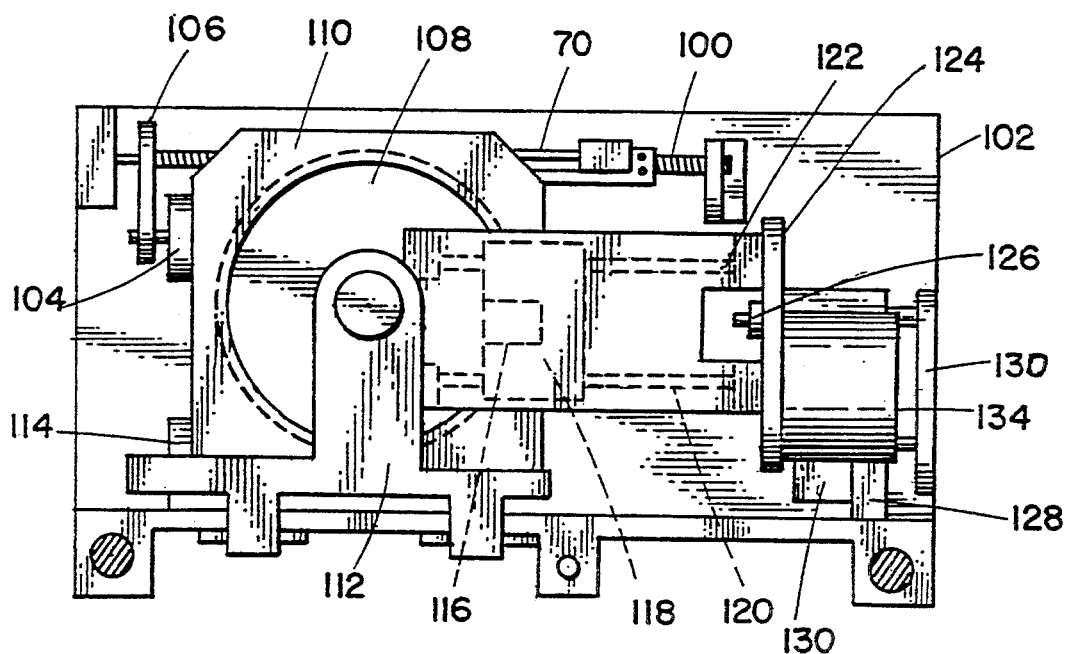
FIG. 5 is a view in side elevation of one of the data read and write units of FIG. 3 shown with it's cover removed.

As seen in FIG. 5, the electromagnet is carried on a traveling nut which is guided by a rod. Both nut and rod are hidden from view behind electromagnet 70 and drive screw 100, respectively. The magnet and nut are driven by the electric motor powered drive screw 100. The vertical position of the magnetizable element is fixed by frame 102. Returning to FIG. 4, as the electromagnet is driven to the right toward the element 76 the air gap becomes smaller. The electromagnet is sufficiently strong so that when the air gap is less than fully closed, the element 74 is drawn to the left and slightly upward carrying the sleeve and disc with it. Thereafter the traveling nut is used to draw the sleeve and disc out of the carrier and into the head unit. The lower edge of the sleeve is dragged along a low friction track formed as part of the head unit. The electromagnet may remain energized to aid in stabilizing the sleeve during disc write or mad. In the preferred method it is deenergized prior to return of the disc to the carrier so that the sleeve's lower edge falls flat against the guide track. That is done to guard against the opposite, lower corner of the sleeve hindering the return operation by engaging an edge of the carrier as that edge moves from the head unit track back into the carrier. That deenergization may not by required because the lower corners of the preferred sleeve are rounded. It is preferred that the electromagnet be energized to hold the magnetizable element and the sleeve against sidewise movement as the sleeve is being pushed back into the carrier.

The Read or Write Head Unit

Figure 6:
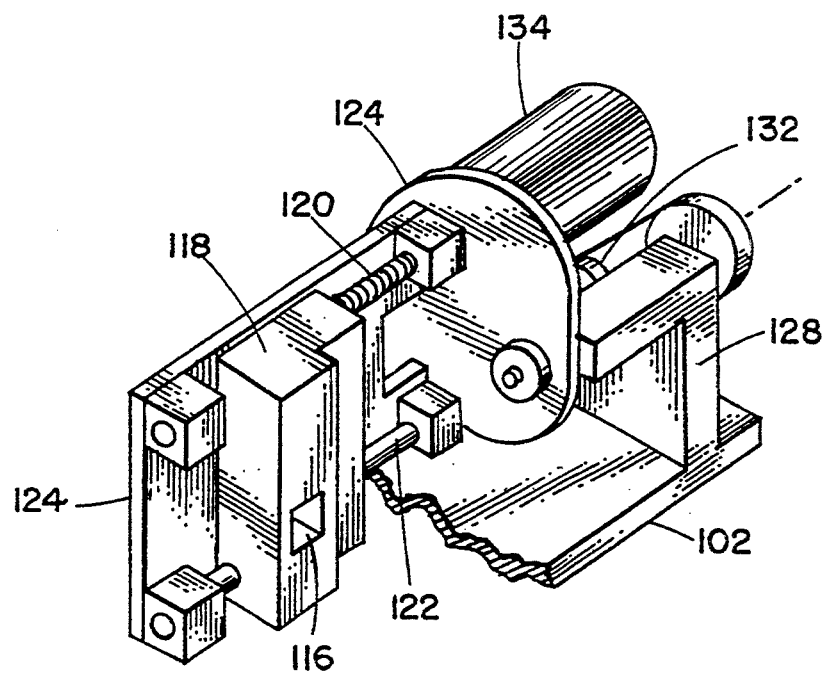
FIG. 6 is an isometric, schematic fragment of those elements of the data read and write view unit involved in moving the read and write heads from either side of a disc to the other.

The organization of a preferred read or write head unit is shown in FIGS. 5 and 6. The cover has been removed to reveal a generally L-shaped base frame 102 on which the mechanical and electromechanical parts are mounted. The electromagnet drive screw 100 is belt driven by a motor 104. The belt is numbered 106.

A disc 108 and its carrier 110 are shown in read and write position in the head unit. The disc center is clamped in position for rotation by clamp 112. The clamp is opened and closed by a lever system, which is hidden from view, and an actuator 114. The motor that drives the disk is mounted on the opposite side of the disk on a drive shaft which engages the disc at the margins of the disc's central opening. The read and write heads are mounted in a head block 116 which is mounted for reciprocation over the surface of the disc toward and away from the disc center. The head block is mounted on a traveling nut 118. The nut is mounted on the parallel combination of a lead screw 120 and a rod 122. The ends of the lead screw and the rod are fixed to a subframe 124. The subframe is fixed to a pivot axle 126. The axle is mounted for rotation in a bracket 128 which forms a part of base frame 102. The pivot axle is rotated by a motor and pulley combination 132 through a belt drive 130. Motor 132 is mounted on the bracket. The motor 134 which drives the lead screw 120 is mounted on subframe 124.

The subframe 124 is rotatable about pivot axle 126 to carry the head assembly from one side of the disc to the other. In FIG. 5 the subframe is positioned on the side of the disc toward the viewer. It is the back of the subframe that is visible. The head block 116, the traveling nut 118 and the lead screw 120 and the guide rod 122 are mounted on the side of the subframe away from the viewer and not visible. For that reason they are depicted in dashed lines.

In FIG. 6 the subframe 124 is shown in the position it occupies when rotated to place the head block on the opposite side of the disc. In this view the parts not associated with turning the heads from one side of the disc to the other have been omitted. The subframe is rotatable independently of the mechanism for transporting the head unit between disk positions. Thus, the subfame may be rotated from one side to the other as the head unit is being moved to a new disc position. The result is reduced operation time.

I claim:

1. The method of withdrawing an optical disc sleeve from a storage unit in which it is stored in close proximity and parallel to other optical disc sleeves, in the circumstance in which the sleeve is formed, in part, of non-magnetic sheet material with an optical disc therebetween which method comprises the steps of:

providing the optical sleeve with at least one magnetizable element configured as a spacer between opposing surfaces of said sheet material with said element at a corner of said sleeve and having an angled edge;

moving an electromagnet with a matingly contoured angled edge into proximity with said angled edge of said magnetizable element such that the magnetizable element is magnetizable as part of the electromagnet's flux path; and moving the electromagnet in a direction to pull the sleeve from the storage unit.

2. The method defined in claim 1 which comprises the further step of forcing return of the sleeve to the storage unit by moving the electromagnet structure in the direction opposite said first mentioned direction.

3. The method defined in claim 1 which that the electromagnet is moved to a position proximate to the magnetizable element both in the direction in which the sleeve is to be moved and above the magnetizable element.

4. The method according to claim 1 wherein said matingly contoured edges are configured so that said step of moving the electromagnet in a direction to pull the sleeve includes moving the sleeve slightly upwardly prior to pulling whereby to facilitate the moving.

5. In combination:

first and second generally flat sleeve portions of non-magnetizable material for forming a sleeve;

an optical disc contained within said sleeve; and spacers affixed between said first and second sleeve portions, at least one of said spacers being a magnetizable element fixed to one corner of said sleeve, and forming part of said sleeve.

6. The combination defined in claim 5 in which a portion of said magnetizable material is exposed to the exterior of said sleeve.

7. The invention defined in claim 5 in which said sleeve is generally square except that at least one corner is formed at an angle to the adjacent sides, said magnetizable element being fixed in said at least one corner.

8. The combination of claim 5 wherein said spacers between said first and second sleeve portions include two magnetizable elements affixed to adjacent corners of said sleeve.

9. The combination of claim 5 wherein said sleeve portions are formed as one piece which is folded.

10. The combination of claim 5 in which said sleeve is generally square and wherein each of said magnetizable elements is generally identically configured and includes an angled edge at the respective corner.

11. The combination of claim 10 further including means for retaining said sleeve in a given position and means for moving said sleeve from said given position, said moving means including an electromagnet with a matingly contoured angled edge for engagement with said angled edge of said magnetizable element.

12. In combination:

a carrier for optical discs having at least one open end;

a plurality of optical discs each contained in a generally flat sleeve and positioned side by side in said carrier with an edge of each exposed to said open side;

a plurality of magnetizable elements each fixed to a respectively associated one of said sleeves;

a head unit mounted for movement to positions opposite selected ones of said sleeves at said open side of said carrier;

a structure carried by said head unit electrically energizable to become an electromagnet and movable relative to said head unit between a position proximate to the magnetizable element of the sleeve opposite which the head unit is positioned and a retracted position on said head unit; and means for moving said structure from one of said positions to the other.

13. In combination:

a plurality of optical discs arranged in parallel planes in juxtaposition;

a read or write head unit moveable transversely to said plurality of optical discs to a position opposite any selected one of said optical discs;

disc withdrawal and reinsertion means for moving said selected optical disc from an original position in juxtaposition with others to a position on said read or write head unit and for returning said optical disk to said original position, the disc withdrawal and reinsertion means comprising a generally flat sleeve of containing said optical disc, a magnetizable element fixed to one edge of said sleeve, and an electromagnet structure carried by said read or write head unit, and means for moving said electromagnet structure.

14. The invention defined in claim 13 which further comprises:

means carried by said read or write head unit for rotating said optical disc while holding said disk in a given plane; p1 an optical write head; and means including a member on which said head is carried for rotating said head from a position proximate to one side of said given plane to a position proximate to the opposite side of said given plane.

15. The invention defined in claim 14 in which said sleeve is generally square except that at least one corner is formed at an angle to the adjacent sides, said magnetizable element being fixed in said one corner.

* * * * *